(12) United States Patent
Sim

(10) Patent No.: US 12,339,559 B1
(45) Date of Patent: Jun. 24, 2025

(54) ELECTRO-OPTIC DISPLAYS AND METHODS FOR DISCHARGING REMNANT VOLTAGE USING BACKLIGHT

(71) Applicant: E INK CORPORATION, Billerica, MA (US)

(72) Inventor: Teck Ping Sim, Acton, MA (US)

(73) Assignee: E Ink Corporation, Billerica, MA (US)

( * ) Notice: Subject to any disclaimer, the term of this patent is extended or adjusted under 35 U.S.C. 154(b) by 470 days.

(21) Appl. No.: 18/050,164

(22) Filed: Oct. 27, 2022

Related U.S. Application Data

(60) Provisional application No. 63/287,614, filed on Dec. 9, 2021.

(51) Int. Cl.
| | | |
|---|---|---|
| *G02B 26/00* | (2006.01) | |
| *G02F 1/167* | (2019.01) | |
| *G02F 1/1676* | (2019.01) | |
| *G02F 1/16766* | (2019.01) | |

(52) U.S. Cl.
CPC ............ *G02F 1/167* (2013.01); *G02F 1/1676* (2019.01); *G02F 1/16766* (2019.01)

(58) Field of Classification Search
CPC ..... G02F 1/167; G02F 1/1676; G02F 1/16766
USPC ................................................. 359/245–297
See application file for complete search history.

(56) References Cited

U.S. PATENT DOCUMENTS

| | | | |
|---|---|---|---|
| 5,760,761 A | 6/1998 | Sheridon | |
| 5,777,782 A | 7/1998 | Sheridon | |
| 5,808,783 A | 9/1998 | Crowley | |
| 5,930,026 A | 7/1999 | Jacobson et al. | |
| 6,054,071 A | 4/2000 | Mikkelsen, Jr. | |
| 6,055,091 A | 4/2000 | Sheridon et al. | |
| 6,097,531 A | 8/2000 | Sheridon | |
| 6,128,124 A | 10/2000 | Silverman | |
| 6,137,467 A | 10/2000 | Sheridon et al. | |
| 6,147,791 A | 11/2000 | Sheridon | |
| 6,241,921 B1 | 6/2001 | Jacobson et al. | |
| 6,445,489 B1 | 9/2002 | Jacobson et al. | |
| 6,504,524 B1 | 1/2003 | Gates et al. | |
| 6,512,354 B2 | 1/2003 | Jacobson et al. | |

(Continued)

OTHER PUBLICATIONS

Kitamura, T. et al., "Electrical toner movement for electronic paper-like display", Asia Display/IDW '01, pp. 1517-1520, Paper HCS1-1 (2001). 2001.

(Continued)

*Primary Examiner* — Mahidere S Sahle
(74) *Attorney, Agent, or Firm* — Jason P. Colangelo

(57) ABSTRACT

A method and apparatus for reducing a remnant voltage of an electro-optic display. The display includes a light-transmissive front electrode, a layer of electro-optic material, pixel electrodes, thin film transistors positioned adjacent to the electro-optic material, a light source positioned adjacent the thin film transistors, and a display driver coupled to the light source and to a gate and source line of each thin film transistor. Each thin film transistor includes a photo-sensitive semiconductor region. The layer of electro-optic material and the light source are disposed on opposite sides of the thin film transistors. The display driver is configured to apply substantially the same voltage to the front electrode and source lines of the thin film transistors, and activate a driving signal to the light source to emit a light having an intensity sufficient to activate the thin film transistors to create a conduction path for draining a remnant voltage.

28 Claims, 7 Drawing Sheets

(56) References Cited

U.S. PATENT DOCUMENTS

| | | |
|---|---|---|
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,900,851 B2 | 5/2005 | Morrison et al. |
| 6,922,276 B2 | 7/2005 | Zhang et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,688,297 B2 | 3/2010 | Zehner et al. |
| 7,715,088 B2 | 5/2010 | Liang et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,859,742 B1 | 12/2010 | Chiu et al. |
| 7,952,557 B2 | 5/2011 | Amundson |
| 7,956,841 B2 | 6/2011 | Albert et al. |
| 7,982,479 B2 | 7/2011 | Wang et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,373,649 B2 | 2/2013 | Low et al. |
| 8,384,658 B2 | 2/2013 | Albert et al. |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,593,396 B2 | 11/2013 | Amundson et al. |
| 8,605,032 B2 | 12/2013 | Liu et al. |
| 8,643,595 B2 | 2/2014 | Chung et al. |
| 8,665,206 B2 | 3/2014 | Lin et al. |
| 8,681,191 B2 | 3/2014 | Yang et al. |
| 8,730,153 B2 | 5/2014 | Sprague et al. |
| 8,810,525 B2 | 8/2014 | Sprague |
| 8,928,562 B2 | 1/2015 | Gates et al. |
| 8,928,641 B2 | 1/2015 | Chiu et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,171,508 B2 | 10/2015 | Sprague et al. |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,269,311 B2 | 2/2016 | Amundson |
| 9,279,906 B2 | 3/2016 | Kang |
| 9,299,294 B2 | 3/2016 | Lin et al. |
| 9,373,289 B2 | 6/2016 | Sprague et al. |
| 9,390,066 B2 | 7/2016 | Smith et al. |
| 9,390,661 B2 | 7/2016 | Chiu et al. |
| 9,412,314 B2 | 8/2016 | Amundson et al. |
| 9,460,666 B2 | 10/2016 | Sprague et al. |
| 9,495,918 B2 | 11/2016 | Harrington et al. |
| 9,513,743 B2 | 12/2016 | Sjodin et al. |
| 9,514,667 B2 | 12/2016 | Lin |
| 9,542,895 B2 | 1/2017 | Gates et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,672,766 B2 | 6/2017 | Sjodin |
| 9,691,333 B2 | 6/2017 | Cheng et al. |
| 9,721,495 B2 | 8/2017 | Harrington et al. |
| 9,792,861 B2 | 10/2017 | Chang et al. |
| 9,792,862 B2 | 10/2017 | Hung et al. |
| 9,966,018 B2 | 5/2018 | Gates et al. |
| 10,319,313 B2 | 6/2019 | Harris et al. |
| 10,339,876 B2 | 7/2019 | Lin et al. |
| 10,444,553 B2 | 10/2019 | Laxton |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0303780 A1 | 12/2008 | Sprague et al. |
| 2009/0174651 A1 | 7/2009 | Jacobson et al. |
| 2009/0322721 A1 | 12/2009 | Zehner et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2011/0063314 A1 | 3/2011 | Chiu et al. |
| 2011/0175875 A1 | 7/2011 | Lin et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2013/0063333 A1 | 3/2013 | Arango et al. |

(56) References Cited

U.S. PATENT DOCUMENTS

| | | |
|---|---|---|
| 2013/0249782 A1 | 9/2013 | Wu et al. |
| 2014/0009817 A1 | 1/2014 | Wilcox et al. |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2015/0005720 A1 | 1/2015 | Zang et al. |
| 2015/0262255 A1 | 9/2015 | Khajehnouri et al. |
| 2016/0012710 A1 | 1/2016 | Lu et al. |
| 2016/0140910 A1 | 5/2016 | Amundson |

OTHER PUBLICATIONS

Yamaguchi, Y. et al., "Toner display using insulative particles charged triboelectrically", Asia Display/IDW '01, pp. 1729-1730, Paper AMD4-4 (2001). 2001.

Hayes, R.A. et al., "Video-Speed Electronic Paper Based on Electrowetting", Nature, vol. 425, No. 25, pp. 383-385 (Sep. 2003). Sep. 25, 2003.

ELECTRO-OPTIC DISPLAYS AND METHODS FOR DISCHARGING REMNANT VOLTAGE USING BACKLIGHT

CROSS-REFERENCE TO RELATED APPLICATIONS

This application claims priority to U.S. Provisional Patent Application No. 63/287,614, filed Dec. 9, 2021, the entire contents of which are incorporated herein. Further, the entire contents of any patent, published application, or other published work referenced herein are incorporated by reference in their entireties.

FIELD OF THE INVENTION

This invention relates to reflective electro-optic displays and materials for use in such displays. More specifically, this invention relates to displays with reduced remnant voltage and methods for reducing remnant voltage in electro-optic displays.

BACKGROUND OF THE INVENTION

Electro-optic displays driven by direct current (DC) imbalanced waveforms may produce a remnant voltage, this remnant voltage being ascertainable by measuring the open-circuit electrochemical potential of a display pixel. In some instances, the remnant voltage causes drift in the measured optical state of a display when the display receives the identical update instructions after some elapsed period of time. It has been found that remnant voltage is a more general phenomenon in electrophoretic and other impulse-driven electro-optic displays, both in cause(s) and effect(s). It has also been found that DC imbalances may cause long-term lifetime degradation of electrophoretic displays, e.g., due to electrochemical reactions at the interface of the pixel electrode and the electro-optic medium or an adhesive layer.

The term "remnant voltage" is also sometimes used as a term of convenience referring to an overall phenomenon. However, the basis for the switching behavior of impulse-driven electro-optic displays is the application of a voltage impulse (the integral of voltage with respect to time) across the electro-optic medium. Remnant voltage may reach a peak value immediately after the application of a driving pulse, and thereafter may decay substantially exponentially. The persistence of the remnant voltage for a significant time period applies a "remnant impulse" to the electro-optic medium, and strictly speaking this remnant impulse, rather than the remnant voltage, may be responsible for the effects on the optical states of electro-optic displays normally considered as caused by remnant voltage.

In theory, the effect of remnant voltage should correspond directly to remnant impulse. In practice, however, the impulse switching model can lose accuracy at low voltages. Some electro-optic media have a threshold, such that a remnant voltage of about 1 V may not cause a noticeable change in the optical state of the medium after a drive pulse ends. However, other electro-optic media, including preferred electrophoretic media used in experiments described herein, a remnant voltage of about 0.5 V may cause a noticeable change in the optical state. Thus, two equivalent remnant impulses may differ in actual consequences, and it may be helpful to increase the threshold of the electro-optic medium to reduce the effect of remnant voltage. E Ink Corporation has produced electrophoretic media having a "small threshold" adequate to prevent remnant voltage experienced in some circumstances from immediately changing the display image after a drive pulse ends. If the threshold is inadequate or if the remnant voltage is too high, the display may present a kickback/self-erasing or self-improving phenomenon. Where the term "optical kickback" is used herein to describe a change in a pixel's optical state which occurs at least partially a response to the discharge of the pixel's remnant voltage.

Even when remnant voltages are below a small threshold, remnant voltage may have a serious effect on image switching if they still persist when the next image update occurs. For example, suppose that during an image update of an electrophoretic display a +/−15 V drive voltage is applied to move the electrophoretic particles. If a +1 V remnant voltage persists from a prior update, the drive voltage would effectively be shifted from +15 V/−15 V to +16 V/−14 V. As a result, the pixel would be biased toward the dark or white state, depending on whether it has a positive or negative remnant voltage. Furthermore, this effect varies with elapsed time due to the decay rate of the remnant voltage. The electro-optic material in a pixel switched to white using a 15 V, 300 ms drive pulse immediately after a previous image update may actually experience a waveform closer to 16 V for 300 ms, whereas the material in a pixel switched to white one minute later using the exact same drive pulse (15 V, 300 ms) may actually experience a waveform closer to 15.2 V for 300 ms. Consequently the pixels may show noticeably different shades of white.

If the remnant voltage field has been created across multiple pixels by a prior image (say a dark line on a white background) then the remnant voltages may also be arrayed across the display in a similar pattern. In practical terms then, the most noticeable effect of remnant voltage on display performance may be ghosting. This problem is in addition to the problem previously noted, namely that DC imbalance (e.g. 16 V/14 V instead of 15 V/15 V) may be a cause of slow lifetime degradation of the electro-optic medium.

Of course, rapid remnant voltage discharge can lead to unintended behavior. For example, if a remnant voltage decays slowly and is nearly constant, then its effect in shifting the waveform does not vary from image update to update and the display may actually experience less ghosting (a.k.a., image persistence, a.k.a., staining) than a remnant voltage that decays quickly. Thus the ghosting experienced by updating one pixel after 10 minutes and another pixel after 11 minutes is much less than the ghosting experienced by updating one pixel immediately and another pixel after 1 minute. Conversely, a remnant voltage that decays so quickly that it approaches zero before the next update occurs may, in practice, cause no detectable ghosting.

There are multiple potential sources of remnant voltage. It is believed (although some embodiments are in no way limited by this belief), that one large cause of remnant voltage is ionic polarization within the materials of the various layers forming the display.

To summarize, remnant voltage as a phenomenon can present itself as image ghosting or visual artifacts in a variety of ways, with a degree of severity that can vary with the elapsed times between image updates. Remnant voltage can also create a DC imbalance and reduce ultimate display lifetime. The effects of remnant voltage therefore may be deleterious to the quality of the electrophoretic or other electro-optic device and it is desirable to minimize both the remnant voltage itself, and the sensitivity of the optical states of the device to the influence of the remnant voltage.

Thus, discharging a remnant voltage of an electro-optic display may improve the quality of the displayed image, even in circumstances where the remnant voltage is already low.

Conventional techniques for reducing remnant voltage involve setting the pixels' front and rear electrodes to approximately the same voltage and simultaneously activating the pixels' transistors for a specified period of time and/or until the amount of remnant voltage remaining in the pixel is less than a threshold amount. However, the select line control circuitry of standard active-matrix driver chips typically does not include a control signal for driving all gate lines to levels that achieve the above-mentioned conduction state for all pixel transistors. Conventional techniques therefore must utilize specially designed select line driver chips having an input control line that allows an external signal to impose a condition whereby all select line outputs receive a voltage supplied to the select driver that brings all of the pixel transistors into conduction. In practice, this specialized voltage control and associated electronics impose design overhead and can add significant cost for enabling the discharging mechanism. Thus, techniques for discharging remnant voltages from electro-optic displays that are simpler to implement and more cost effective are needed.

SUMMARY OF THE INVENTION

The subject matter presented herein provides displays with reduced remnant voltage and methods for reducing remnant voltage in electro-optic displays.

In one aspect, the invention features an electro-optic display including a light-transmissive front electrode, a layer of electro-optic material, an array of pixel electrodes, and an array of thin film transistors positioned adjacent to a surface of the layer of electro-optic material. Each thin film transistor includes a photo-sensitive semiconductor region, and each pixel electrode is coupled to a single thin film transistor. The electro-optic display also includes at least one light source positioned adjacent to the array of thin film transistors. The layer of electro-optic material and the at least one light source are disposed on opposite sides of the array of thin film transistors. The electro-optic display also includes a display driver coupled to the at least one light source and to a gate line and a source line of each of the thin film transistors. There is only one thin film transistor operatively connected between the display driver and each pixel electrode. The display driver is configured to apply substantially the same voltage to the light-transmissive front electrode and the source line of each of the thin film transistors. The display driver is also configured to activate a driving signal to the at least one light source to emit a light having an intensity sufficient to activate the array of thin film transistors to create a conduction path for draining a remnant voltage.

In another aspect, the invention features a method for reducing a remnant voltage of an electro-optic display. The method includes providing an electro-optic display including a light-transmissive front electrode, a layer of electro-optic material, an array of pixel electrodes, and an array of thin film transistors positioned adjacent to a surface of the layer of electro-optic material. Each thin film transistor includes a photo-sensitive semiconductor region, and each pixel electrode is coupled to a single thin film transistor of the array of thin film transistors. The electro-optic display also includes at least one light source positioned adjacent to the array of thin film transistors, and a display driver coupled to the at least one light source and to a gate line and a source line of each of the thin film transistors. The layer of electro-optic material and the at least one light source are disposed on opposite sides of the array of thin film transistors, and there is only one thin film transistor operatively connected between the display driver and each pixel electrode. The method also includes applying, by the display driver, substantially the same voltage to the light-transmissive front electrode and the source line of each of the thin film transistors. The method also includes activating, by the display driver, a driving signal to the at least one light source to emit a light having an intensity sufficient to activate the array of thin film transistors to create a conduction path for draining a remnant voltage.

Aspects of the invention can include one or more of the following features. In some embodiments, the layer of electro-optic material includes an electrophoretic medium. In some embodiments, the electrophoretic medium includes charged particles that move in the presence of an electric field. In some embodiments, the array of thin film transistors include n-type thin film transistors, and the display driver applies substantially a ground potential to the light-transmissive front electrode and the source line of each of the thin film transistors. In some embodiments, the array of thin film transistors include p-type thin film transistors, and the display driver applies substantially a positive voltage to the light-transmissive front electrode and the source line of each of the thin film transistors.

In some embodiments, the display driver applies a voltage between 5V and 15V to the light-transmissive front electrode and the source line of each of the thin film transistors.

In some embodiments, the array of thin film transistors are formed on a light-transmissive substrate. In some embodiments, the at least one light source is positioned to emit light onto the array of thin film transistors. In some embodiments, the at least one light source is in optical communication with the photo-sensitive semiconductor region of each thin film transistor. In some embodiments, the at least one light source is positioned to emit light onto the gate line of each thin film transistor. In some embodiments, the at least one light source emits light onto an unmasked portion of each thin film transistor. In some embodiments, the at least one light source emits light onto a portion each thin film transistor without a light-blocking material.

In some embodiments, the electro-optic display includes a light guide positioned between the at least one light source and the array of thin film transistors. In some embodiments, the electro-optic display includes an optical diffuser positioned between the at least one light source and the array of thin film transistors. In some embodiments, the electro-optic display includes one or more of a light guide plate, a diffuser sheet, a prismatic film, and a polarizer positioned between the at least one light source and the array of thin film transistors.

In some embodiments, the driving signal is one of a DC voltage, an AC voltage, and a pulse wave modulated signal.

In some embodiments, the at least one light source is configured to emit a light having an intensity of at least 900 lux in response to the driving signal. In some embodiments, the at least one light source is configured to emit a light having an intensity of at least 1300 lux in response to the driving signal. In some embodiments, the at least one light source is configured to emit a light having an intensity of at least 1700 lux in response to the driving signal.

In some embodiments, the at least one light source includes a plurality of light emitting diodes positioned along an outer edge of the electro-optic display device. In some embodiments, the at least one light source includes an array of light emitting diodes positioned coincident with the array of thin film transistors.

DETAILED DESCRIPTION OF THE INVENTION

Figure 1:
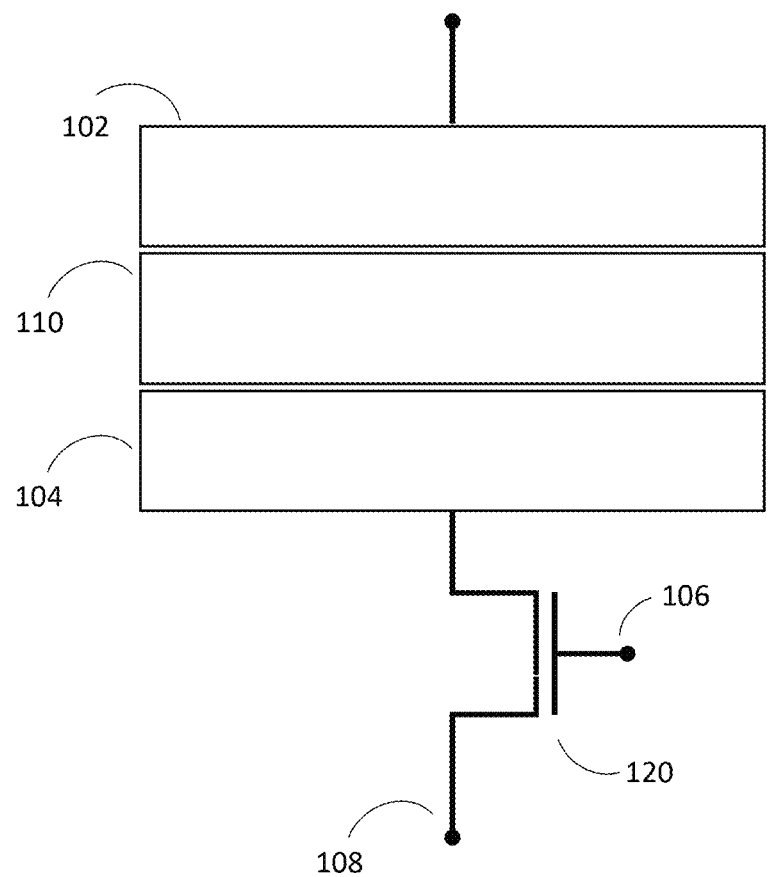
FIG. 1 is a diagram representing an electrophoretic display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, and luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a drive scheme which only drives pixels to their two extreme optical states with no intervening gray states.

The electro-optic displays described herein include one or more pixels whose optical state can be driven through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. In some embodiments, a waveform or a driving waveform may include a plurality of driving pulses configured to drive a display pixel to a desired optical state. In between the plurality of driving pulses the display pixel may be kept in a floating state. In some embodiments, when the display is in this floating state, the display pixel's transistor (e.g., see element 120 below in FIG. 1) may be in a non-conductive state, for example, the gate voltage to of the pixel's transistor may be low.

In practice, a display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531;

6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564.
(h) Applications of displays; see for example U.S. Pat. Nos. 7,312,784; 8,009,348;
(i) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710; and Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Publication No. 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in U.S. Pat. No. 7,420,549, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, the patents U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high-resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As in known in the art, voltage is relative and a measure of a charge differential between two points. One voltage value is relative to another voltage value. For example, zero voltage ("0V") refers to having no voltage differential relative to another voltage.) After a pre-selected interval known as the "line address time," a selected row is deselected, another row is selected, and the voltages on the column drivers are changed so that the next line of the display is written.

However, in use, certain waveforms may produce a remnant voltage to pixels of an electro-optic display. As evident from the discussion above, this remnant voltage produces several unwanted optical effects and is in general undesirable.

As presented herein, a "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in the optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in the optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible.

"Edge ghosting" is another type of ghosting in which an outline (edge) of a portion of a previous image remains visible. This type of artifact is caused by an inter-pixel effect so-called "blooming." For example, in both monochrome and color systems there is a tendency for the electric field generated by a pixel electrode to affect an area of the electro-optic medium wider than that of the pixel electrode itself so that, in effect, one pixel's optical state spreads out into parts of the areas of adjacent pixels. Further, in some instances driving adjacent pixels brings about a final optical state in the area between the pixels that differs from the optical state reached by either of the adjacent pixels themselves. This final optical state in the area between the adjacent pixels is caused by an electric field experienced in the inter-pixel region that is the average of the electric fields applied to the adjacent pixels. It has been found that edge ghosting can be mitigated by driving the electro-optic display with DC imbalanced waveforms. However, as discussed above, the DC imbalanced waveforms may produce a remnant voltage.

Where the term "optical kickback" is used herein to describe a change in a pixel's optical state that occurred at least partially due to the discharge of the pixel's remnant voltage.

Figure 2:
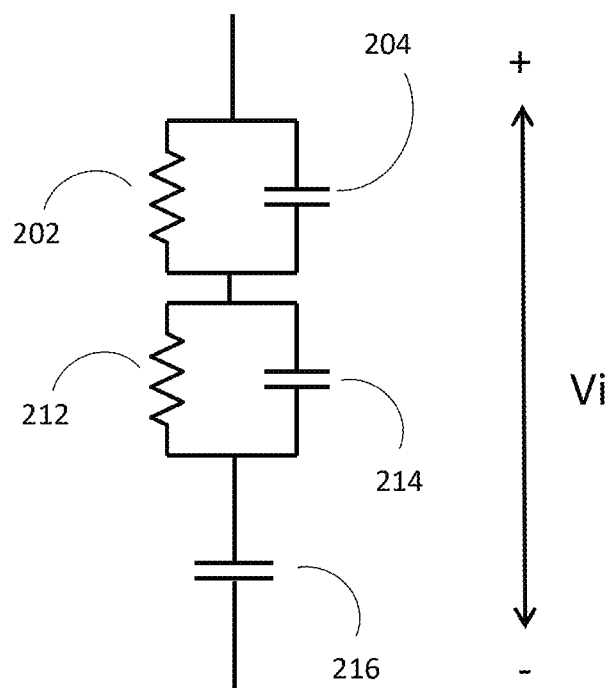
FIG. 2 shows a circuit model of the electro-optic imaging layer.

FIGS. 1 and 2 respectively provide a high level schematic of a pixel including portions of an electro-optic display, and a corresponding equivalent circuit model of the components and interfaces of the electro-optic imaging layer across which a remnant voltage may be present.

FIG. 1 shows a simplified schematic of a pixel 100 of an electro-optic display in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent and may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined and/or driven by the intersection of one specified row and one specified column. In some embodiments, the matrix of pixels may be an "active matrix," in which each pixel is associated with at least one non-linear circuit element 120. The non-linear circuit element 120 may be coupled between rear electrode 104 and an addressing electrode 108. In some embodiments, non-linear element 120 may include a diode and/or a transistor, including, without limitation, a MOSFET. The drain (or source) of the MOSFET may be coupled to rear electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to rear electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Utilizing the electro-optic displays described below in reference to FIGS. 3A and 3B, the discharge of the remnant voltage of a pixel may be initiated and/or controlled by applying any suitable set of signals to a pixel, including, without limitation, the sets of signals as illustrated in more detail below in FIGS. 4A-4C.

Figure 3A:
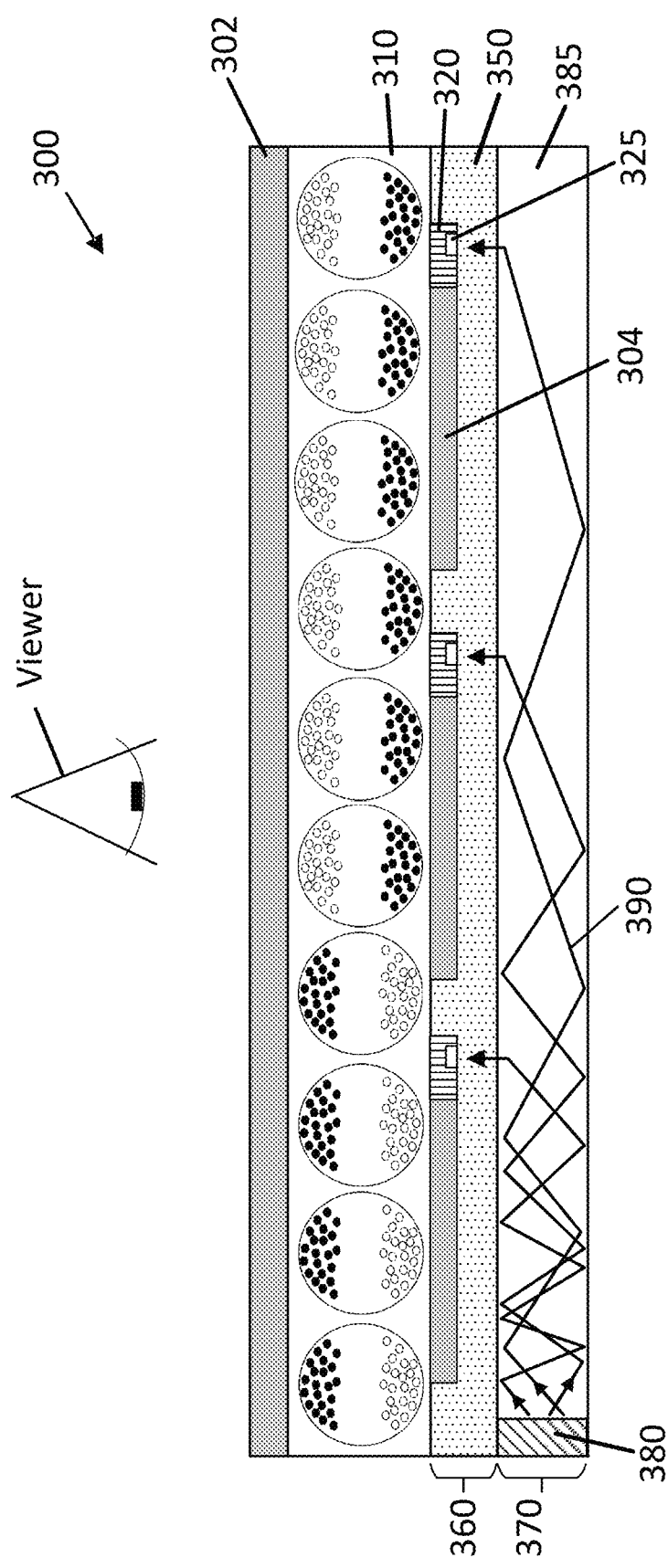
FIG. 3A shows a cross-sectional diagram illustrating exemplary embodiments of an electrophoretic display having an edge lit backlight in accordance with the subject matter presented herein.
Figure 3B:
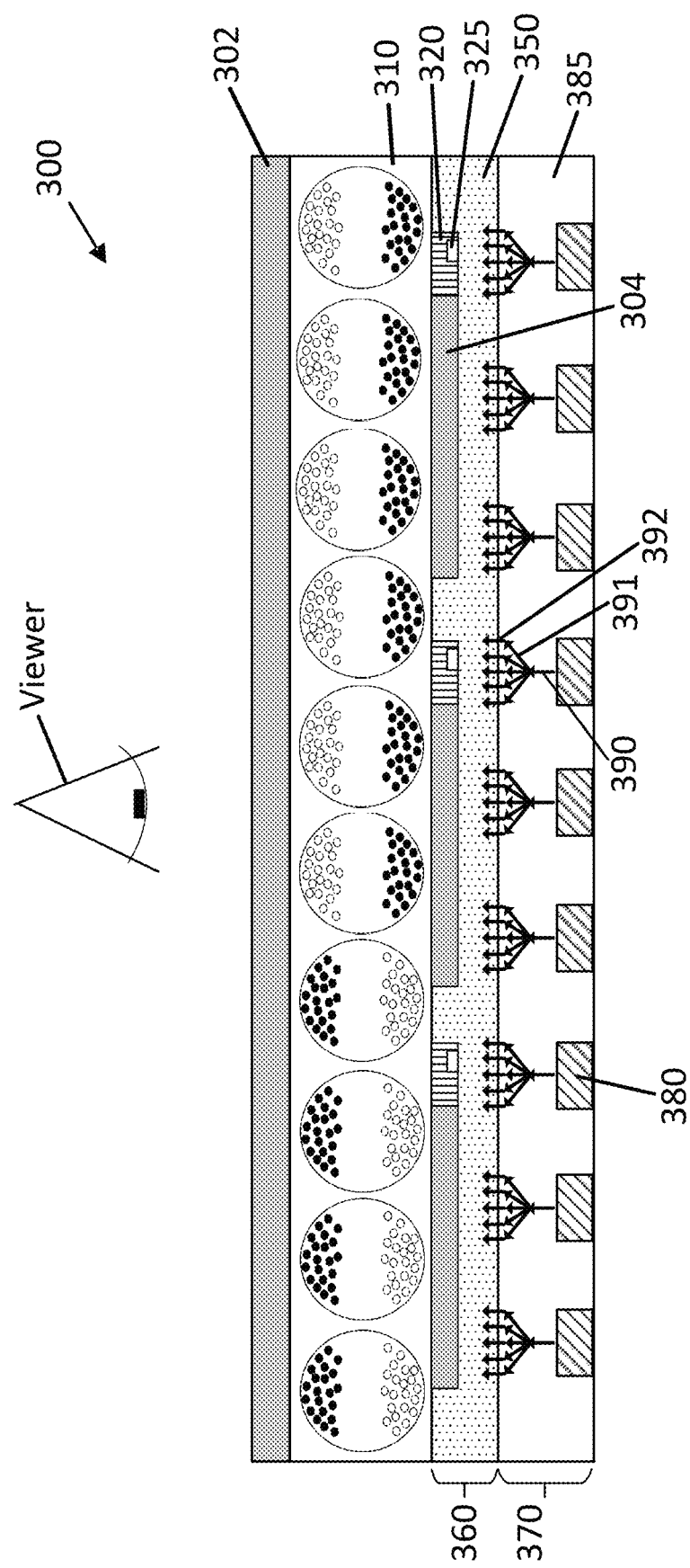
FIG. 3B is a cross-sectional diagram illustrating exemplary embodiments of an electrophoretic display having an array lit backlight in accordance with the subject matter presented herein.

FIG. 3A and FIG. 3B are cross-sectional diagrams illustrating exemplary embodiments of an electro-optic display 300 in accordance with the subject matter presented herein. FIGS. 3A and 3B both show an electro-optic display 300 including transparent front electrode 302, electrophoretic medium 310, and a plurality of rear electrodes 304. FIG. 3A also includes backlight 370 in an edge lit configuration, while FIG. 3B includes backlight 370 in an array configuration.

The transparent front electrode 302 represents the viewing side of the electro-optic display 300, and as such comprises a light-transmissive transparent conductor, such as indium tin oxide (ITO), which in some cases can be deposited onto a transparent substrate, such as polyethylene terephthalate (PET). In some embodiments, transparent front electrode 302 comprises a transparent conductor deposited onto glass, a plastic, or a polyester substrate. Electro-optic display 300 can also include a protective layer (not shown), which may simply protect transparent front electrode 302 from damage, or it may envelop the entirety of electro-optic display 300 to prevent ingress of liquids such as water, etc.

Each rear electrode 304 is associated with at least one non-linear circuit element 320. For example, the pixels of an active matrix are typically arranged in a two-dimensional array of rows and columns, such that any specific pixel is uniquely defined by the intersection of one specified row and one specified column. The source lines (e.g., FIG. 1, 108) of all the non-linear circuit elements 320 are connected to a single column (scan or addressing) line, while the gate lines (e.g., FIG. 1, 106) of all the non-linear circuit elements 320 are connected to a single row (gate) line. In such a configuration, each drain line of each of the non-linear circuit elements 320 is connected to a single rear electrode 304. (The assignment of sources to rows and gates to columns is conventional but essentially arbitrary, and could be reversed if desired. Further, in some embodiments, the connections of the drain and source lines can be reversed.)

In some embodiments, the non-linear circuit elements 320 and rear electrodes 304 can be formed or disposed on a substrate 350 using conventional microfabrication (i.e., including photolithography, metal deposition, ion implantation, etc.). Substrate 350 can be a rigid or flexible structure formed from a variety of plastics, polymeric films, metal foils, and glass. In some embodiments, substrate 350 is a plastic film or other flexible material, and non-linear circuit elements 320 and rear electrodes 304 are printed onto substrate 350.

Although each non-linear circuit element 320 is depicted in FIGS. 3A and 3B as being positioned side-by-side with its corresponding rear electrode 304, other configurations of backplane 360 are within the scope of the present disclosure. As one example, backplane 360 can be formed such that each non-linear circuit element 320 is positioned underneath its corresponding rear electrode 304 with a layer of insulating material positioned in between the two.

Electro-optic display 300 can also include circuitry (not shown) for controlling the timing and voltage levels of the waveforms used to drive each display pixel to a desired optical state to display an image. This control circuitry can be contained within a display controller or processor, along with "select or gate driver" and "source driver" integrated circuits (ICs) or chips. These devices can each be separate chips mounted on a display module, or they may be integrated into a single chip. In some embodiments, the gate and source line control circuitry is integrated into a single display driver chip that is coupled to a separate display controller.

The control circuitry discussed above is electrically-coupled to the gate and source lines of each non-linear circuit element 320, and varies the voltages applied to those lines to put each non-linear circuit element 320 into a conductive state (e.g., $VGS>VGS(th)$ for n-type non-linear circuit elements 320, $VGS<VGS(th)$ for p-type non-linear circuit elements 320) or non-conductive state (e.g., $VGS<VGS(th)$ for n-type non-linear circuit elements 320, $VGS>VGS(th)$ for p-type non-linear circuit elements 320).

In accordance with the subject matter presented herein, each non-linear circuit element 320 can be a thin-film transistor formed using light- or photo-sensitive semiconductors that can cause the non-linear circuit element 320 to conduct if exposed to a sufficient amount of light. For example, non-linear circuit element 320 can be an n-type or p-type transistor having a gate responsive to both an electric field and exposure to incident light such that sufficient changes in either can control the current flow through the transistor. In some embodiments, non-linear circuit element 320 is a phototransistor or photoFET. In some embodiments, non-linear circuit element 320 is fabricated such that incident light for changing the conductivity of non-linear circuit element 320 is absorbed by one or more of the gate, a semiconductor coupled to the gate, and the junction of the gate and the drain (or the source depending on whether n-type or p-type transistors are used).

To prevent ambient light entering electro-optic display 300 from changing the state of non-linear circuit element 320 at an undesired time (e.g., when non-linear circuit element 320 is being actively driven by the display controller to update the optical state of the display), the components of non-linear circuit element 320 are typically covered or masked with an opaque light-blocking material. According to embodiments of the current invention, non-linear circuit element 320 can include an unmasked portion 325 that only allows light to enter each non-linear circuit element 320 from the side facing backlight 370. Further, unmasked portion 325 can be sized and positioned to only permit light to reach certain photo-sensitive regions of the non-linear circuit element 320 (e.g., the gate, a semiconductor coupled to the gate, and the junction of the gate and/or the drain or the source depending on whether n-type or p-type transistors are used). In addition, backlight 370 can include opaque or reflective portions to prevent the photo-sensitive regions of non-linear circuit element 320 from being exposed to light that was not emitted by light sources 380 (e.g., light emitted from a frontlight, ambient light, etc.) which could interfere with the operation of electro-optic display 300.

The electrophoretic medium 310 contains at least one electrophoretic particle, however a second electrophoretic particle, or a third electrophoretic particle, a fourth electrophoretic particle, or more particles is feasible. The electrophoretic medium 310 typically includes a solvent, such as isoparaffins, and may also include dispersed polymers and charge control agents to facilitate state stability, e.g. bistability, i.e., the ability to maintain an electro-optic state without inputting any additional energy.

Although shown in FIGS. 3A and 3B to include microcapsules, as described above, electrophoretic medium 310 can be compartmentalized by microcapsules or the walls of microcells. The layer of electrophoretic medium 310 can be coated or embossed onto a plastic substrate or film bearing a transparent coating of an electrically conductive material (e.g., transparent front electrode 302). This assembly may be laminated to the structure made up of substrate 350, non-linear circuit elements 320, and rear electrodes 304 (collectively referred to as backplane 360) using an electrically conductive adhesive. Alternatively, the layer of electrophoretic medium 310 can be dispensed directly onto a thin open-cell grid that has been arranged on backplane 360. The filled grid can then be top-sealed with an integrated protective sheet/light-transmissive electrode (e.g., transparent front electrode 302).

Although not shown, electro-optic display 300 can also include one or more adhesive layers (e.g., between transparent front electrode 302 and electrophoretic medium 310, between electrophoretic medium 310 and backplane 360, between backplane 360 and backlight 370), and/or sealing layers as needed. In some embodiments an adhesive layer may include a primer component to improve adhesion to the transparent front electrode 302, or a separate primer layer (not shown in FIGS. 3A-3B) may be used. (The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

Backlight 370 includes light source 380 and optical conditioner 385. Light source 380 is typically one or more light-emitting diodes (LEDs) arranged in an edge lit (FIG. 3A) or array (FIG. 3B) configuration. However, one of skill in the art will appreciate that light source 380 can comprise other types of light sources (e.g., an electroluminescent panel (ELP), lasers, hot or cold cathode fluorescent lamps, etc.)

Electro-optic display 300 can also include circuitry (not shown) for controlling the timing and magnitude of voltages applied to each light source 380 to turn them on and off, and tune the intensity of the emitted light. In some embodiments, this control circuitry is contained within the display controller or the gate and source drivers. In some embodiments, the control circuitry is contained within a separate IC coupled to the display controller and/or the gate and source drivers. For example, the light source control chip can be enabled and disabled using a general purpose input/output (GPIO) controlled by the display controller. In some embodiments, the light source control chip is controlled by the display controller via a low pin-count peripheral interface (e.g., Inter-Integrated Circuit (I2C), Serial Peripheral Interface (SPI), Controller Area Network (CAN) bus, etc.). In some embodiments, the timing and magnitude of the voltages applied to light sources 380 can be individually controlled for each device.

As described above, backlight 370 includes components to provide the light emitted by light source 380 in a uniform manner. In some embodiments, the light emitted from backlight 370 is of a sufficiently low intensity that it is not distracting, or imperceptible to, a user of electro-optic display 300. Operating backlight 370 such that it emits low intensity light also reduces power consumption when operating backlight 370. In some embodiments, backlight 370 emits light having an illuminance or intensity of about 900, 1300, or 1700 lux. In some embodiments, backlight 370 emits light having an intensity in the range of 200-1000 lux.

FIG. 3A shows backlight 370 in an edge lit configuration, meaning that light source 380 is arranged in a strip or line of light sources positioned along an outer edge of electro-optic display 300 (e.g., top edge, bottom edge, left edge, right edge). FIG. 3B shows backlight 370 in an array configuration, meaning that light source 380 comprises a plurality of light sources arranged uniformly throughout backlight 370 behind backplane 360. In some embodiments, light source 380 is a single light-emitting component and elements of optical conditioner 385 direct and spread light 390 emitted from light source 380 evenly behind backplane 360.

Optical conditioner 385 includes one or more components for manipulating and directing light 390 emitted from light source 380. For example, optical conditioner 385 can include one or more of each of the following: a light guide plate, a diffuser sheet, a prismatic film, and a polarizer.

As shown in FIG. 3A, light source 385 emits light 390 at angles substantially oblique to the surface of backplane 260 adjacent to backlight 370. Accordingly, optical conditioner 385 can include a light guide to redirect light 390 entering the light guide plate such that it exits the light guide plate substantially perpendicular to the surface of backplane 260 adjacent to backlight 370. FIG. 3A shows light 390 being directed at each of the non-linear circuit elements 320 of backplane 360. However, in some embodiments, the light guide plate directs light 390 uniformly onto all of, or substantially all of, the surface of backplane 260 adjacent to backlight 370. The light guide plate can be plate formed from an optically clear material (e.g., polymers such as polycarbonate, poly methyl methacrylate (PMMA) and other acrylics, or materials with similar properties). In addition to the light guide plate, embodiments of optical conditioner 385 shown in FIG. 3A can also include one or more of each of the following: a diffuser sheet, a prismatic film, and a polarizer, for further conditioning light 390 as described in more detail below in reference to FIG. 3B.

As shown in FIG. 3B, each light source 385 emits light 390 substantially perpendicular to the surface of backplane 260 adjacent to backlight 370. In some embodiments, the light 390 initially emitted by each light source 385 is sufficient to cause the non-linear circuit elements 320 to conduct as described in more detail below without requiring additional elements in optical conditioner 385 to condition the light. However, depending on considerations such as the position and number of light sources 385 present in backlight 370, as well as the desired uniformity of the light and the overall dimensions of the area to be illuminated by the emitted light, other elements may be present in optical conditioner 385.

In some embodiments, optical conditioner 385 includes a diffuser sheet having features that spread the angle of light 390 and distribute it evenly across a wider portion of the surface of backplane 260, as denoted by distributed light 391 in FIG. 3B. The diffuser sheet can be formed from PMMA and other acrylics, polymers such as polycarbonate, a polystyrene based material, PET, or materials with similar properties.

In some embodiments, optical conditioner 385 also includes a prismatic sheet or film positioned in between the diffuser sheet and backplane 260. The prismatic film can have angled ridges on its surface adjacent to backplane 360 that focus and redirect the off-axis distributed light 391, and emit light 392 (FIG. 3B) at an optimal angle (e.g., substantially perpendicular to the surface of backplane 260 adjacent to backlight 370) for causing the non-linear circuit elements 320 to conduct as described in more detail below. The prismatic film can be formed from PMMA and other acrylics, polymers such as polycarbonate, a polystyrene based material, PET, or materials with similar properties. In some embodiments, the prismatic film is formed from acrylic resin on a PET substrate, and has microprism ridge structures having a height of about 10 to 100 μm. In some embodiments, optical conditioner 385 includes one or more polarizers for further filtering the light entering backplane 360 from backlight 370.

Figure 4A:
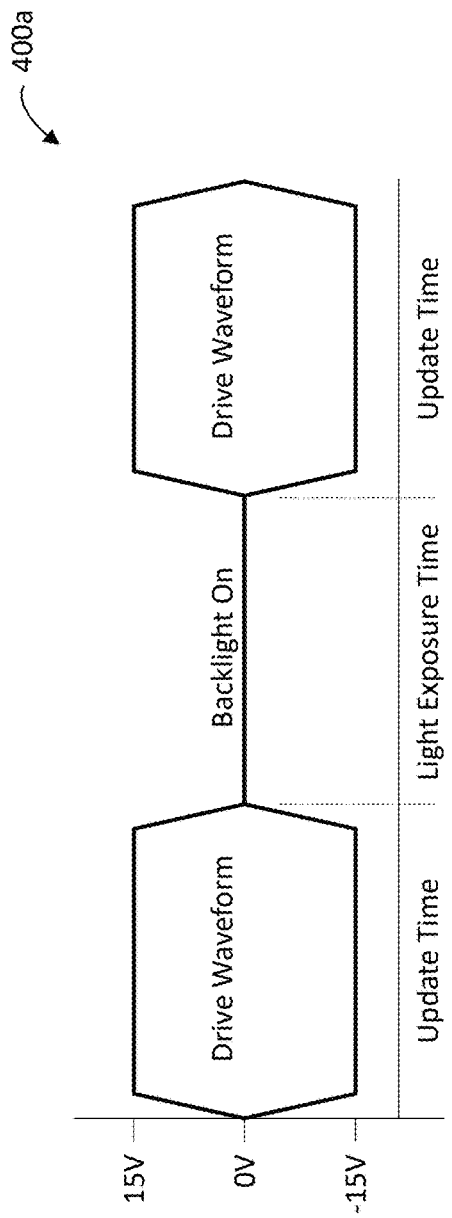
FIG. 4A is a driving schematic according to an exemplary embodiment of the invention in which the TFTs are exposed to light in between updates to the display.

FIG. 4A is a driving schematic 400a according to an exemplary embodiment of the invention in which the TFTs are exposed to light in between updates to the display. As shown, after one or more drive waveforms or signals (i.e., one or more positive and/or negative voltage pulses) have been applied to a display pixel to update its optical state (denoted by "Update Time" in FIG. 4A), one or more driving signals are sent to backlight 370 to enable light sources 380 to begin emitting light at a predetermined intensity (denoted by "Light Exposure Time" in FIG. 4A). As described above, the driving signal and the associated circuitry for controlling the operation of light sources 380 can implemented in a number of ways such as a GPIO or low pin-count peripheral interface controlled by the display controller that enables operation of a light source control chip. One of skill in the art will appreciate that these exemplary control schemes are not limiting, and other control schemes are within the scope of the present disclosure.

Immediately prior to, or contemporaneously with, enabling light sources 380, substantially the same voltage is applied to transparent front electrode 302 and the source lines of non-linear circuit elements 320. For example, the voltage applied to transparent front electrode 302 (commonly referred to as "VCOM") and the source lines of non-linear circuit elements 320 can be substantially 0V or ground potential. Also at this time, the gate line of each non-linear circuit element 320 is set to a voltage suitable for de-activating the non-linear circuit element 320 (e.g., a value lower than the pixel transistor's threshold voltage, VGS (th)), effectively interrupting the conduction path or channel between the source and drain lines. In some embodiments, the gate line of each non-linear circuit element 320 is set to substantially 0V or ground potential.

As discussed above, each non-linear circuit element 320 can include an unmasked portion 325 that is sized and positioned to direct light emitted from light sources 380 to the photo-sensitive semiconductor regions of non-linear circuit elements 320 (e.g., the gate, a semiconductor coupled to the gate, and the junction of the gate and/or the drain or the source depending on whether n-type or p-type transistors are used). As such, despite the gate lines being set to a voltage suitable for de-activating non-linear circuit element 320, exposing the photo-sensitive semiconductor regions to the light emitted from light sources 380 can activate non-linear circuit element 320, effectively creating a conduction path for draining a remnant voltage from electro-optic display 300.

As shown in FIG. 4A, the remnant-voltage draining 'Light Exposure Time' can be maintained until the optical state of electro-optic display 300 is updated at a subsequent Update Time. As such, any post-update remnant voltage present on the pixels of electro-optic display 300 can be eliminated or significantly reduced to levels that are not deleterious to the quality or useable lifetime of the display.

Accordingly, the electrophoretic display and corresponding method of reducing remnant voltage presented herein provide advantages over conventional displays and driving methods.

For example, conventional displays and techniques for reducing remnant voltage must utilize specially-designed select line driver chips that can drive all select line outputs to a voltage level that brings all of the pixel transistors into conduction while the pixels' front and rear electrodes are set to approximately the same voltage. By way of example, displays for which non-linear circuit elements 320 are n-type transistors must use a select driver having an "Xon" control line input that can cause the "gate high" voltage to be routed to all the select lines simultaneously. These specialized driver chips increase design overhead and unit cost for enabling the conventional discharging method. In contrast, as described above, the circuit of electro-optic display 300 that controls backlight 370 can be nothing more than a GPIO or simple interface connection that is already widely available on standard display controllers.

Further, it is known that application of a voltage for a prolonged period of time to the gate of a non-linear circuit element 320 (as is done by conventional techniques for reducing remnant voltage) can result in positive bias stress which can cause significant variations in non-linear circuit element 320's transfer function characteristics. These variations manifest themselves as a shift in gate threshold voltage, degradation in sub-threshold swing, and/or a deterioration in the overall performance of the transistor. Because the inventive displays and techniques described herein do not rely on application of a positive voltage to the gate of non-linear circuit element 320, the occurrence of positive bias stress can be eliminated or significantly reduced, thereby increasing the accuracy and usable lifetime of electro-optic display 300.

Figure 4B:
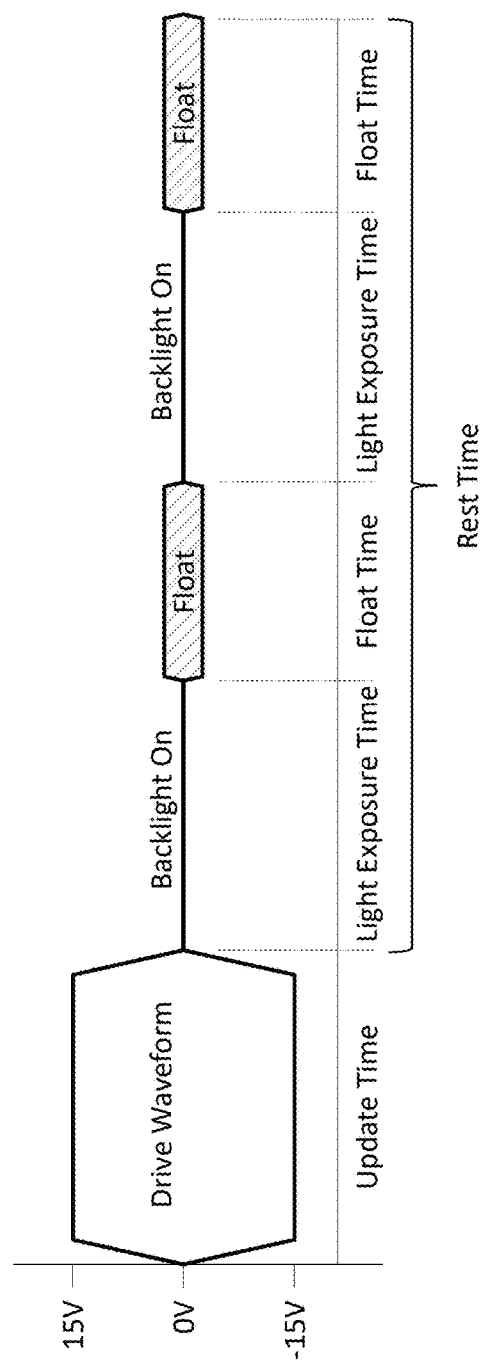
FIG. 4B is a driving schematic according to an exemplary embodiment of the invention in which the TFTs are successively exposed to light and put into a floating state following an update to the display.

FIG. 4B is a driving schematic 400b according to another exemplary embodiment of the invention in which non-linear circuit elements 320 are successively exposed to light and put into a floating state following an update to the display. As shown in diagram 400b, after an initial 'Light Exposure Time' period, the pixels of electro-optic display 300 can be placed in an electrically-floating state (denoted by 'Float Time'). The pixel may be placed in the electrically-floating state using any suitable technique, including, without limitation, setting the gate line voltage of each non-linear circuit element 320 to a value suitable for interrupting the conduction path (e.g., a value lower than the pixel transistor's threshold voltage), and placing transparent front electrode 302 in a high-impedance state. Further, light sources 380 can be turned off during the 'Float Time' period.

As shown in FIG. 4B, the 'Float Time' period can be followed by a subsequent 'Light Exposure Time' period and 'Float Time' period. Electro-optic display 300 can successively alternate between 'Light Exposure Time' periods and 'Float Time' periods any number of times before the next update to the optical state of the display (e.g., 'Update Time') occurs. Because light sources 380 are turned off non-linear circuit elements 320 are not actively driven during the 'Float Time' period, this embodiment can be effective to save system power during periods when there is a long time gap between updates to the display, or when the display is in a standby or rest mode (denoted by 'Rest Time').

Figure 4C:
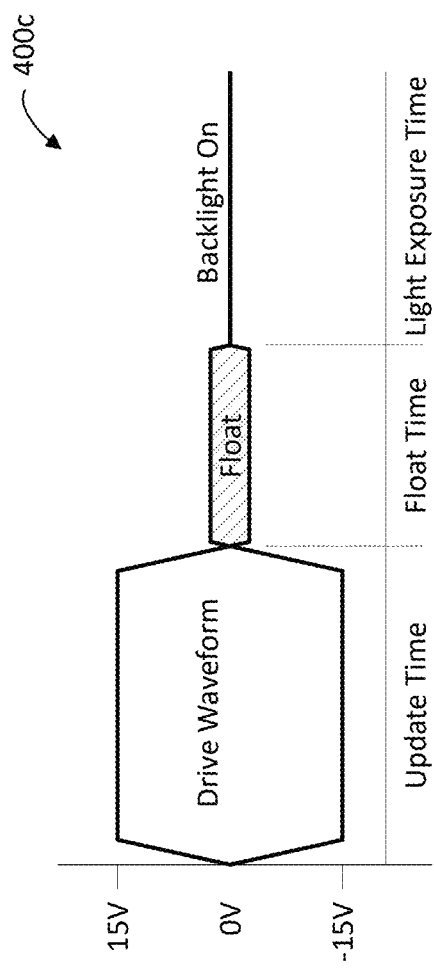
FIG. 4C is a driving schematic according to an exemplary embodiment of the invention in which the TFTs are put into a floating state then exposed to light following an update to the display.

FIG. 4C is a driving schematic 400c according to an exemplary embodiment of the invention in which non-linear circuit elements 320 are put into a floating state then exposed to light following an update to the display. In practice, when non-linear circuit elements 320 are in the floating state, the leakage current is very low such that it can be ignored as if an open connection exists between non-linear circuit elements 320 and any conductive paths. Accordingly, entering the 'Float Time' period prior to the 'Light Exposure Time' period can be effective to mitigate short-term kickback after an 'Update Time' period, particularly for non-linear circuit elements 320 with semiconductor regions that are highly sensitive to light.

Figure 5:
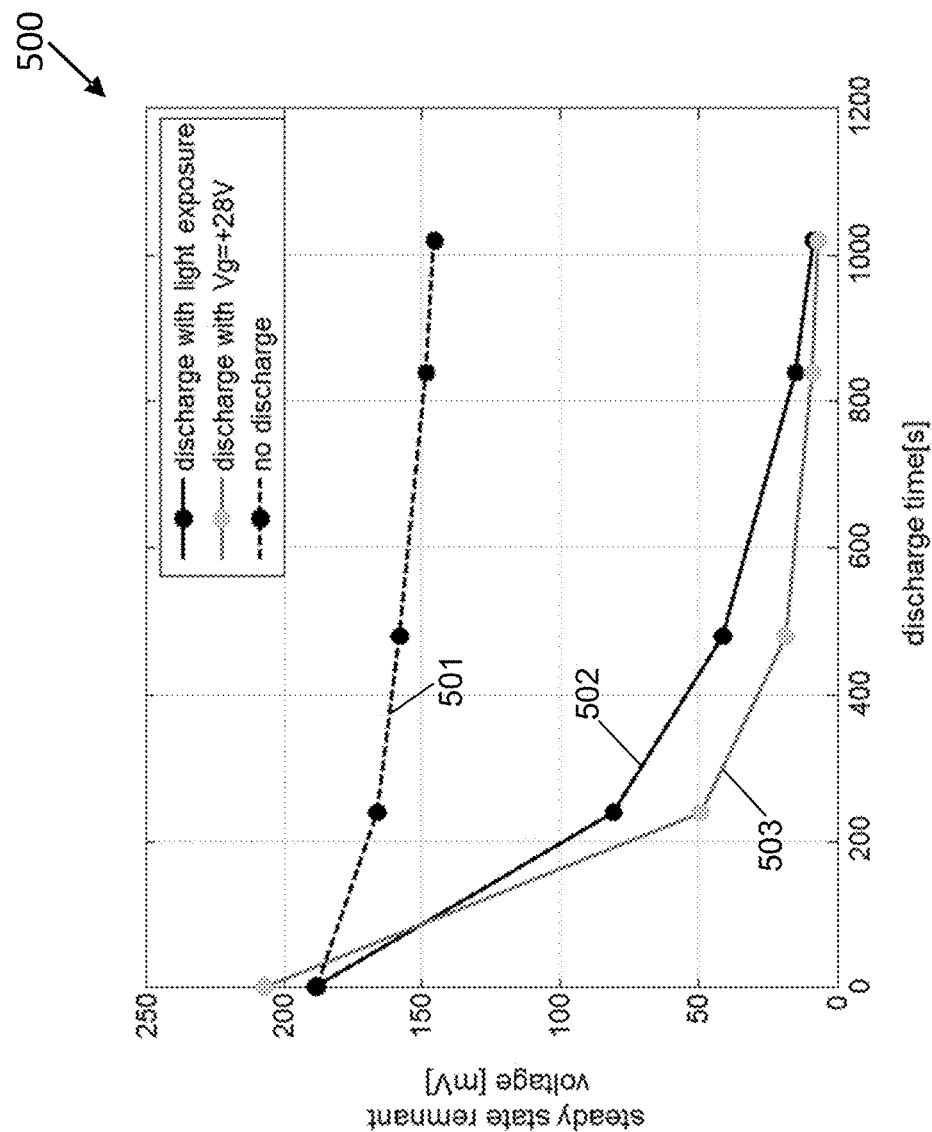
FIG. 5 is a graph illustrating the remnant voltage discharge performance of various discharge methods.

FIG. 5 is a graph 500 illustrating the remnant voltage discharge performance of various discharge methods. Graph 500 includes three plots of remnant voltage in mV versus time in seconds. Plot 501 shows the discharge of remnant voltage when no discharge technique is employed. As shown, the remnant voltage decays less than 100 mV over several hundred seconds.

Plot 503 shows the discharge of remnant voltage employing the conventional discharge techniques described above for which all gate lines are driven to a voltage that brings all of the pixel transistors into conduction. Finally, plot 502 shows the discharge of remnant voltage according to the inventive techniques described herein by which non-linear circuit elements 320 are rendered conductive by exposing their photo-sensitive semiconductor regions to light to reduce remnant voltage. In this case, the light emitted had an intensity between 250 and 750 lux.

As illustrated in graph 500, the conventional technique initially reduces remnant voltage at a faster rate than the inventive techniques described herein, but over time, the remnant voltage is reduced by substantially the same amount by both techniques. If desired, the discharge rate of the inventive techniques can be increased by increasing the intensity of the light emitted by backlight 370, while still retaining advantages over the conventional displays and discharge techniques described herein.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. An electro-optic display comprising:
a light-transmissive front electrode;

a layer of electro-optic material;
an array of pixel electrodes;
an array of thin film transistors positioned adjacent to a surface of the layer of electro-optic material, each thin film transistor comprising a photo-sensitive semiconductor region, wherein each pixel electrode is coupled to a single thin film transistor;
at least one light source positioned adjacent to the array of thin film transistors, wherein the layer of electro-optic material and the at least one light source are disposed on opposite sides of the array of thin film transistors; and
a display driver coupled to the at least one light source and to a gate line and a source line of each of the thin film transistors, wherein there is only one thin film transistor operatively connected between the display driver and each pixel electrode, the display driver configured to:
  apply substantially the same voltage to the light-transmissive front electrode and the source line of each of the thin film transistors; and
  activate a driving signal to the at least one light source to emit a light having an intensity sufficient to activate the array of thin film transistors to create a conduction path for draining a remnant voltage.

2. The electro-optic display of claim 1 wherein the array of thin film transistors comprises either (i) n-type thin film transistors, and the display driver applies substantially a ground potential to the light-transmissive front electrode and the source line of each of the thin film transistors, or (ii) p-type thin film transistors, and the display driver applies substantially a positive voltage to the light-transmissive front electrode and the source line of each of the thin film transistors.

3. The electro-optic display of claim 1 wherein the at least one light source is in optical communication with the photo-sensitive semiconductor region of each thin film transistor.

4. The electro-optic display of claim 3 wherein the at least one light source is positioned to emit light onto the gate line of each thin film transistor.

5. The electro-optic display of claim 4 wherein the at least one light source emits light onto an unmasked portion of each thin film transistor.

6. The electro-optic display of claim 1 further comprising a light guide positioned between the at least one light source and the array of thin film transistors.

7. The electro-optic display of claim 1 further comprising an optical diffuser positioned between the at least one light source and the array of thin film transistors.

8. The electro-optic display of claim 1 further comprising one or more of a light guide plate, a diffuser sheet, a prismatic film, and a polarizer positioned between the at least one light source and the array of thin film transistors.

9. The electro-optic display of claim 1 wherein the driving signal is one of a DC voltage, an AC voltage, and a pulse wave modulated signal.

10. The electro-optic display of claim 1 wherein the at least one light source is configured to emit a light having an intensity of at least 900 lux in response to the driving signal.

11. The electro-optic display of claim 1 the at least one light source is configured to emit a light having an intensity of at least 1300 lux in response to the driving signal.

12. The electro-optic display of claim 1 wherein the at least one light source is configured to emit a light having an intensity of at least 1700 lux in response to the driving signal.

13. The electro-optic display of claim 1 wherein the at least one light source comprises a plurality of light emitting diodes positioned along an outer edge of the electro-optic display device.

14. The electro-optic display of claim 1 wherein the at least one light source comprises an array of light emitting diodes positioned coincident with the array of thin film transistors.

15. A method for reducing a remnant voltage of an electro-optic display, the method comprising:
  providing an electro-optic display including a light-transmissive front electrode, a layer of electro-optic material, an array of pixel electrodes, an array of thin film transistors positioned adjacent to a surface of the layer of electro-optic material, each thin film transistor comprising a photo-sensitive semiconductor region, wherein each pixel electrode is coupled to a single thin film transistor of the array of thin film transistors, at least one light source positioned adjacent to the array of thin film transistors, wherein the layer of electro-optic material and the at least one light source are disposed on opposite sides of the array of thin film transistors, and a display driver coupled to the at least one light source and to a gate line and a source line of each of the thin film transistors, wherein there is only one thin film transistor operatively connected between the display driver and each pixel electrode;
  applying by the display driver substantially the same voltage to the light-transmissive front electrode and the source line of each of the thin film transistors; and
  activating by the display driver a driving signal to the at least one light source to emit a light having an intensity sufficient to activate the array of thin film transistors to create a conduction path for draining a remnant voltage.

16. The method of claim 15 wherein the array of thin film transistors comprises either (i) n-type thin film transistors, and the display driver applies substantially a ground potential to the light-transmissive front electrode and the source line of each of the thin film transistors, or (ii) p-type thin film transistors, and the display driver applies substantially a positive voltage to the light-transmissive front electrode and the source line of each of the thin film transistors.

17. The method of claim 15 wherein the at least one light source is in optical communication with the photo-sensitive semiconductor region of each thin film transistor.

18. The method of claim 17 wherein the at least one light source is positioned to emit light onto the gate line of each thin film transistor.

19. The method of claim 18 wherein the at least one light source emits light onto an unmasked portion of each thin film transistor.

20. The method of claim 18 further comprising a light guide positioned between the at least one light source and the array of thin film transistors.

21. The method of claim 15 wherein the electro-optic display further comprises an optical diffuser positioned between the at least one light source and the array of thin film transistors.

22. The method of claim 15 wherein the electro-optic display further comprises one or more of a light guide plate, a diffuser sheet, a prismatic film, and a polarizer positioned between the at least one light source and the array of thin film transistors.

23. The method of claim 15 wherein the driving signal is one of a DC voltage, an AC voltage, and a pulse wave modulated signal.

24. The method of claim 15 wherein activating further comprises emitting by the at least one light source a light having an intensity of at least 900 lux in response to the driving signal.

25. The method of claim 15 wherein activating further comprises emitting by the at least one light source a light having an intensity of at least 1300 lux in response to the driving signal.

26. The method of claim 15 wherein activating further comprises emitting by the at least one light source a light having an intensity of at least 1700 lux in response to the driving signal.

27. The method of claim 15 wherein the at least one light source comprises a plurality of light emitting diodes positioned along an outer edge of the electro-optic display device.

28. The method of claim 15 wherein the at least one light source comprises an array of light emitting diodes positioned coincident with the array of thin film transistors.

* * * * *